United States Patent
Kitao

(10) Patent No.: US 6,694,452 B1
(45) Date of Patent: Feb. 17, 2004

(54) DATA PROCESSOR AND METHOD OF PROCESSING DATA

(75) Inventor: Ichiro Kitao, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/472,037

(22) Filed: Dec. 27, 1999

(30) Foreign Application Priority Data

Dec. 25, 1998 (JP) ............................................. 10-371106

(51) Int. Cl.⁷ ................................................. G06F 11/00
(52) U.S. Cl. .............................. 714/23; 714/24; 714/10
(58) Field of Search ............................ 714/10, 23, 25, 714/47, 24

(56) References Cited

U.S. PATENT DOCUMENTS

| | | | | |
|---|---|---|---|---|
| 5,351,216 A | * | 9/1994 | Salt et al. ............... | 365/230.01 |
| 5,574,943 A | * | 11/1996 | Daftari ............................ | 710/1 |
| 5,600,785 A | | 2/1997 | Potter ........................... | 714/23 |
| 5,768,496 A | * | 6/1998 | Lidgett et al. | |
| 5,784,625 A | * | 7/1998 | Walker ........................ | 710/260 |
| 5,864,656 A | * | 1/1999 | Park ............................. | 714/10 |
| 5,964,888 A | * | 10/1999 | Kosak et al. ................ | 701/114 |
| 5,968,172 A | * | 10/1999 | Aleshi .......................... | 710/266 |
| 6,058,447 A | * | 5/2000 | Holst et al. .................. | 710/105 |
| 6,061,810 A | * | 5/2000 | Potter .......................... | 714/23 |
| 6,119,211 A | * | 9/2000 | Kaneko et al. .............. | 711/166 |

FOREIGN PATENT DOCUMENTS

| | | | | |
|---|---|---|---|---|
| EP | 0833341 A2 | * | 4/1998 | ............ G11C/7/00 |
| EP | 0 833 341 | | 4/1998 | |
| EP | 0 833 341 A2 | | 4/1998 | |
| JP | A 2-275513 | | 11/1990 | |
| JP | 2-275513 | | 11/1990 | |
| JP | 02-275513 A | * | 11/1990 | ............. G06F/1/24 |
| JP | A 4-171516 | | 6/1992 | |
| JP | A 5-150866 | | 6/1993 | |
| JP | A 5-197451 | | 8/1993 | |
| JP | A 6-332577 | | 12/1994 | |
| JP | A 7-6155 | | 1/1995 | |
| JP | A 7-200093 | | 8/1995 | |
| JP | A 7-210507 | | 8/1995 | |
| JP | A 8-63449 | | 3/1996 | |
| JP | A 8-272478 | | 10/1996 | |
| JP | A 9-73326 | | 3/1997 | |
| JP | A 9-81539 | | 3/1997 | |
| JP | A 9-146653 | | 6/1997 | |
| JP | 10-063581 | * | 3/1998 | ........... G06F/12/16 |
| JP | A 10-97340 | | 4/1998 | |
| JP | A 10-255490 | | 9/1998 | |
| JP | A 11-110260 | | 4/1999 | |
| JP | 11-110260 | | 4/1999 | |

* cited by examiner

Primary Examiner—Robert Beausoliel
Assistant Examiner—Marc Duncan
(74) Attorney, Agent, or Firm—Young & Thompson

(57) ABSTRACT

A data processor includes a data memory for reading and writing data, a reset detector for detecting any factor of requirement for a reset operation and generating a reset signal. The data processor also includes a data processing unit connected to the data memory for controlling read and write operations of the data memory and also connected to the reset detector for receiving the reset signal from the reset detector to execute a reset operation of the data processor in accordance with the reset signal. The data processor further includes a non-volatile reset memory connected to the reset detector for storing history of outputting the reset signal from the reset detector.

12 Claims, 4 Drawing Sheets

DATA PROCESSOR AND METHOD OF PROCESSING DATA

BACKGROUND OF THE INVENTION

The present invention relates to a data processor for read operation and reset operation in a memory device and a method of processing data.

The data processor is utilized for data processing in various devices such as personal computers. The configuration of the data processor depends on the purpose of data processings. Usually, however, the most of the data processors has a central processing unit (CPU) and a random access memory (RAM). The random access memory (RAM) is provided for executing data read and write operations. The central processing unit (CPU) controls various operations of the random access memory (RAM) such as the read and write operations. If any accident appears in the data processor, it is necessary that the CPU executes a reset operation. Advanced data processors are provided with a reset detector circuit for detecting appearance of the accident in the data processor to send a reset signal to the CPU so that the CPU executes the reset operation in accordance with the received reset signal, in order to prevent the continuous data processing even the accident has appeared.

The data processor is reset by the CPU and re-started, whereby the data processor returns into the initial state, for which reason it is difficult to confirm the factor of the accident. This means that the conventional data processor is incapable of preventing the same accident as having already appeared. It is also difficult for the conventional data processor to detect any irregular operations.

In the above circumstances, it had been required to develop a novel data processor and a method of processing data free from the above problem.

SUMMARY OF THE INVENTION

Accordingly, it is an object of the present invention to provide a novel data processor free from the above problems.

It is a further object of the present invention to provide a novel data processor which is capable of confirming the factor of the accident after the data processor was reset and re-started due to the accident.

It is a still further object of the present invention to provide a novel method of processing data, which allows confirmation of the factor of the accident after the data processor was reset and re-started due to the accident.

The present invention provides a data processor comprising a data memory for reading and writing data, a reset detector for detecting any factor of requirement for reset operation and generating a reset signal, a data processing unit connected to the data memory for controlling read and write operations of the data memory and also connected to the reset detector for receiving the reset signal from the reset detector to execute a reset operation of the data processor in accordance with a reset signal, and a non-volatile reset memory connected to the reset detector for storing history of outputting the reset signal from the reset detector.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
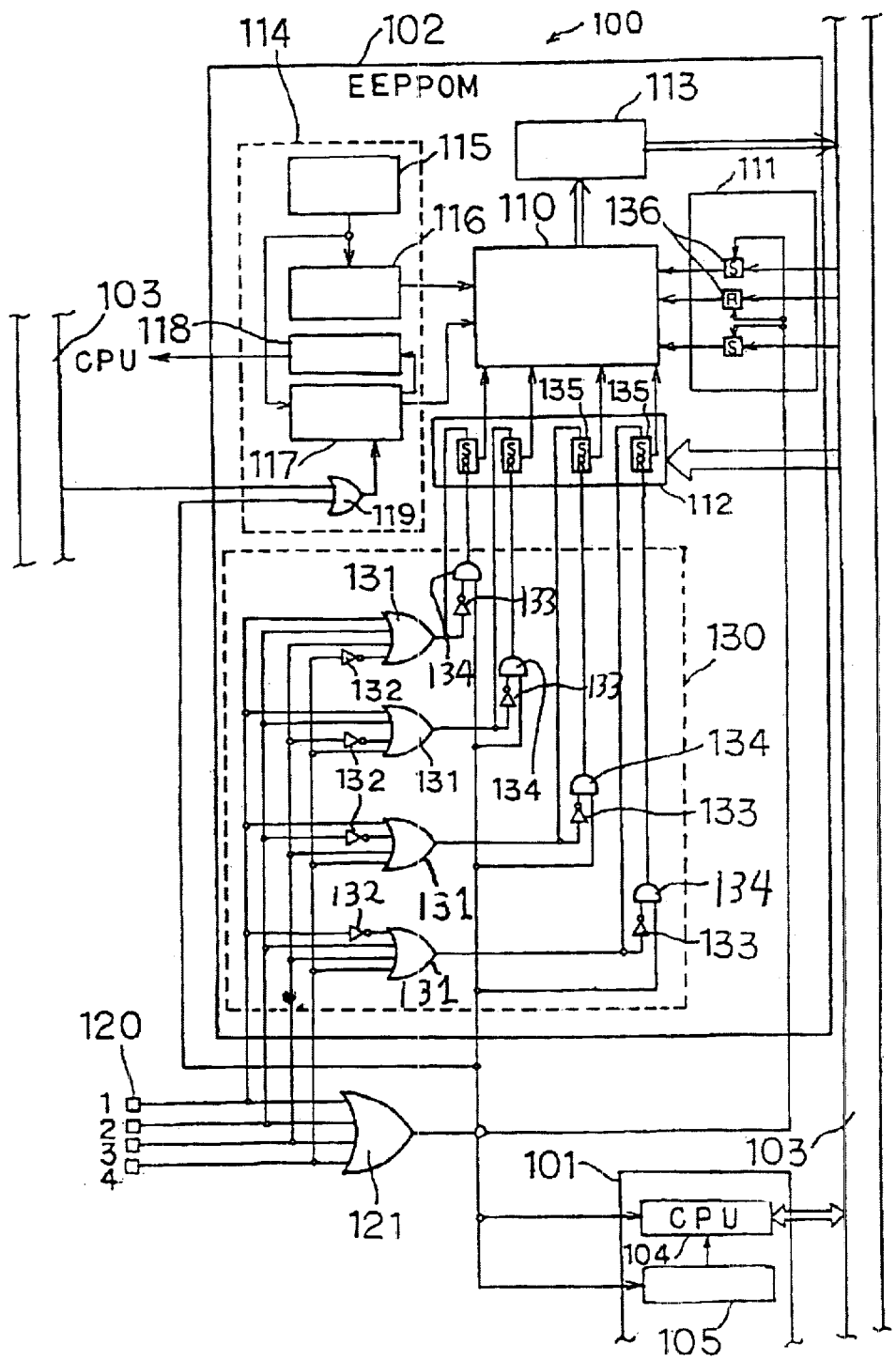
FIG. 1 is a block diagram illustrative of a main part of a first novel data processor in a first embodiment in accordance with the present invention.

The first present invention provides a data processor comprising a data memory for reading and writing data, a reset detector for detecting any factor of requirement for reset operation and generating a reset signal, a data processing unit connected to the data memory for controlling read and write operations of the data memory and also connected to the reset detector for receiving the reset signal from the reset detector to execute a reset operation of the data processor in accordance with a reset signal, and a non-volatile reset memory connected to the reset detector for storing history of outputting the reset signal from the reset detector.

In accordance with the first present invention, the non-volatile reset memory connected to the reset detector stores a history that the reset signal was sent from the reset detector to the CPU for allowing the CPU to have executed the reset operation in accordance with the reset signal received from the reset detector, whereby since the non-volatile reset memory stores the history, it is possible to confirm the fact of appearance of the requirement for reset operation even after the data processor had been reset and re-started.

Namely, in accordance with the first data processing method of the first data processor, the reset detector generates a reset signal upon appearance of the reset factor, whereby the data processing unit executes the reset operation whilst the data about history of sending the reset signal from the reset detector are stored into the non-volatile memory, so that it is possible to verify the reset factor even after the reset operation has been carried out and the data processor has been re-started. It is, therefore, possible to solve the trouble of the data processor and also prevent any further generation of the same reset factor as well as detect user's incorrect operations.

The second present invention provides a data processor comprising a non-volatile data memory for reading and writing data from and to memory addresses, a plurality of reset detectors for detecting plural corresponding factors of requirement for reset operation and generating plural corresponding reset signals, a data processing unit connected to the non-volatile data memory for controlling read and write operations of the non-volatile data memory and also connected to the plural reset detectors for receiving a reset signal from any one of the reset detectors to execute a reset operation of the data processor in accordance with the received reset signal, and a reset writing unit connected to the reset detectors for writing corresponding one of plural predetermined data to the reset signal sent from the one of the plural reset detectors into a corresponding predetermined address of the non-volatile data memory.

In accordance with the second present invention, the reset writing unit is operated to write corresponding one of plural predetermined data to the reset signal sent from the one of the plural reset detectors into a corresponding predetermined address of the non-volatile data memory, whereby since reset writing unit writes the corresponding one of plural predetermined data to the predetermined address of the non-volatile data memory, it is possible to confirm the fact of appearance of the requirement for reset operation even after the data processor had been reset and restarted.

Namely, in accordance with the second data processing method of the second data processor, corresponding one of the plural reset detectors generates a corresponding kind of reset signals upon appearance of the reset factor, whereby the data processing unit executes the reset operation, whilst the data corresponding to the reset factor are stored into specific addresses of the non-volatile memory, so that it is possible to verify the reset factor even after the reset operation has been carried out and the data processor has been re-started. It is, therefore, possible to solve the trouble of the data processor and also prevent any further generation of the same reset factor as well as detect user's incorrect operations.

The third present invention provides a data processor comprising a non-volatile data memory for reading and writing data from and to memory addresses, a plurality of reset detectors for detecting plural corresponding factors of requirement for reset operation and generating plural corresponding reset signals, a data processing unit connected to the non-volatile data memory for controlling read and write operations of the non-volatile data memory and also connected to the plural reset detectors for receiving a reset signal from any one of the reset detectors to execute a reset operation of the data processor in accordance with the received reset signal, and a reset writing unit connected to the reset detectors for writing predetermined data into corresponding one of plural predetermined addresses of the non-volatile data memory to the reset signal sent from the one of the plural reset detectors.

In accordance with the third present invention, the reset writing unit is operated to write predetermined data into corresponding one of plural predetermined addresses of the non-volatile data memory to the reset signal sent from the one of the plural reset detectors, whereby since reset writing unit writes the predetermined data to the corresponding one of plural predetermined addresses of the non-volatile data memory, it is possible to confirm the fact of appearance of the requirement for reset operation even after the data processor had been reset and re-started.

Namely, in accordance with the third data processing method of the third data processor, corresponding one of the plural reset detectors generates a corresponding kind of reset signals upon appearance of the reset factor, whereby the data processing unit executes the reset operation, whilst the data corresponding to the reset factor are stored into designated one of specific addresses of the non-volatile memory, so that it is possible to verify the reset factor even after the reset operation has been carried out and the data processor has been re-started. It is, therefore, possible to solve the trouble of the data processor and also prevent any further generation of the same reset factor as well as detect user's incorrect operations.

In the above data processors, it is possible that the reset write unit generates a predetermined address with plural bits on the basis of the fact that one of the plural reset detectors sends the reset signal to the CPU.

Since the reset write unit generates a predetermined address with plural bits on the basis of the fact that one of the plural reset detectors sends the reset signal, the predetermined data are written into the predetermined address which allows confirmation of the fact of the requirement for the reset operation.

The above data processor may further be provided with a write judge unit for judging whether data are now writing into the data memory under the control of the data processing unit, so that if the write judge unit verifies that the data are now writing into the data memory, then the data processing unit executes the reset operation and the reset write unit withholds to write the predetermined data.

It is also possible that the data processor may further be provided with a data read unit for reading out data from the predetermined address of the data memory, wherein the data were written by the reset write unit, so that the factor of requirement for the reset operation is confirmed on the basis of the read out data.

The above elements of the data processors may be realized in various forms, for example, specific hardwares, computers with programmed functions and computer programs.

PREFERRED EMBODIMENT

FIRST EMBODIMENT

Figure 2:
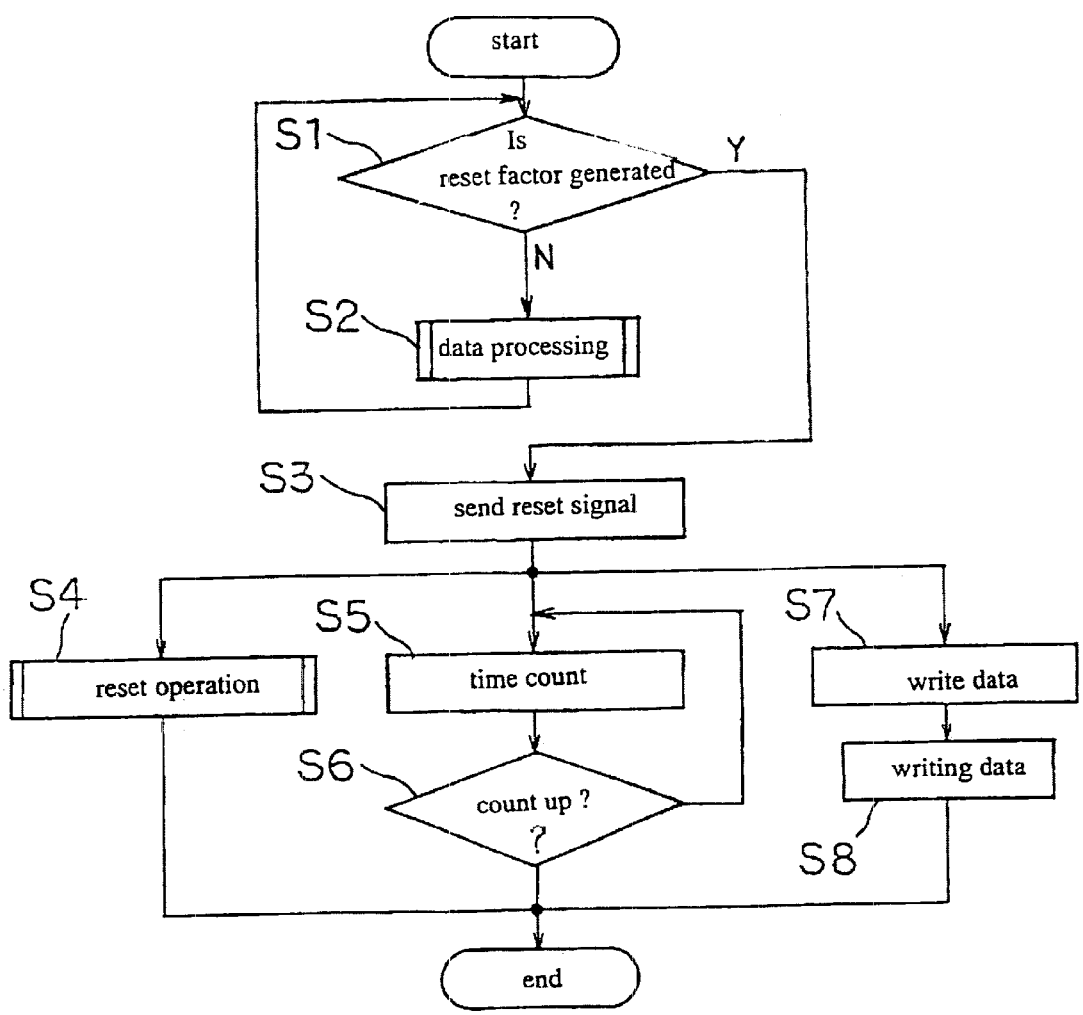
FIG. 2 is a flow chart of a main routine of novel data processes executed by the first novel data processor in a first embodiment in accordance with the present invention.
Figure 3:
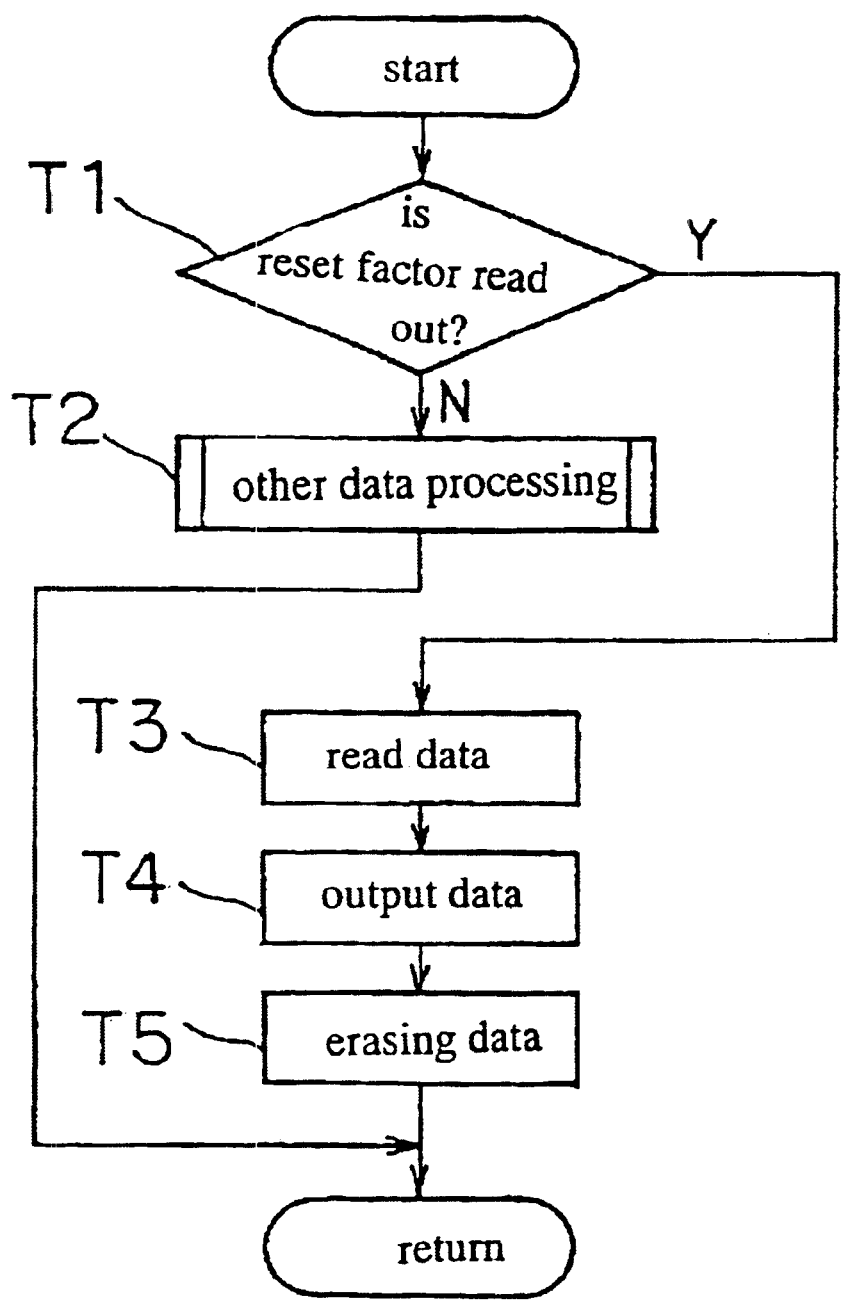
FIG. 3 is a flow chart of a sub-routine of the novel data processes of FIG. 2.

A first embodiment according to the present invention will be described in detail with reference to the drawings. FIG. 1 is a block diagram illustrative of a main part of a first novel data processor in a first embodiment in accordance with the present invention. FIG. 2 is a flow chart of a main routine of novel data processes executed by the first novel data processor in a first embodiment in accordance with the present invention. FIG. 3 is a flow chart of a sub-routine of the novel data processes of FIG. 2.

A data processor 100 a microcomputer 101 which has a data processing unit and a data read out unit and an electrically erasable programmable read only memory (EEPROM) 102 and an internal bus 103 connected to the microcomputer 101 and the EEPROM 102.

The microcomputer 101 has a CPU 104, an oscillator circuit 105, a programmable memory such as a mask programmable ROM not illustrated, a workable memory such as RAM, wherein the CPU executes various processings in accordance with clock signals generated by the oscillator circuit 105.

The EEPROM 102 has a memory cell array 110 as a non-volatile data memory. The memory cell array 110 allows data to be read from or written into addresses. The memory cell array 110 is connected to an address data latch 111 for temporary latching address data. The memory cell array 110 is also connected to a write data latch 112 for temporary latching write data. The memory cell array 110 is also connected to a data read out circuit 113 for reading out read data from the memory cell array 110. The address data latch 111 is also connected to the internal bus 103. The write data latch 112 is also connected to the internal bus 103. The data read out circuit 113 is also connected to the internal bus 103.

A write control circuit 114 is further provided which is connected to the internal bus 103 and also connected to the memory cell array 110. The write control circuit 114 has a ring oscillator 115, a charge pump 116, a write time counter 117, a write flag latch 118 and an OR-gate 119. The write flag latch 118 corresponds to the write judge unit.

The ring oscillator 115 generates a clock signal similarly to the above described ring oscillator 115. The charge pump 116 is connected to the ring oscillator 115 for receiving the clock signal from the ring oscillator 115, so that the charge pump 116 generates a driving voltage necessary for writing data into the memory cell array 110 on the basis of the received clock signal. The write time counter 117 is connected to the ring oscillator 115 for receiving the clock signal from the ring oscillator 115, so that the write time counter 117 is operated to count the necessary time for wiring data into the memory cell array 110 on the basis of the received clock signal. The write flag latch 118 is connected to the write time counter 117 so that the write flag latch 118 latches binary digit write flags which correspond to counting and uncounting operations by the write time counter 117. The OR-gate 119 is connected to the internal bus 103 and also connected to the write time counter 117, so that the OR-gate 119 transmits a write enable signal from the internal bus 103 to the write time counter 117, so that the write time counter 117 executes the counting operation upon receipt of the write enable signal from the OR-gate 119 in order to realize the write judgement.

The data processor 100 is further provided with a plurality of reset detectors 120 which are connected through an OR-gate 121 to the CPU 104 and the oscillator circuit 105 in the microcomputer 101.

The plural reset detectors 120 are placed in individual parts of the data processor 100 so that the plural reset detectors 120 individually detect different type factors of requirement for the reset operation such as a voltage abnormality of a power voltage so as to generate individual reset signals which correspond to the different type factors of requirement for the reset operation. The OR-gate 121 transmits the reset signal upon receipt of at least any one of the individual reset signals to the CPU 104, so that the CPU 104 executes the reset operation upon receipt of the reset signal from the OR-gate 121.

The EEPROM 102 is provided with a reset write circuit 130 which is connected to the plural reset detectors 120, the OR-gate 121 and the write data latch 112.

The reset write circuit 130 comprises the same number of OR-gates 131 as the plural reset detectors 120, inverters 132 connected to input sides of the OR-gates 131, the same number of AND-gates 134 as the plural reset detectors 120, inverters 133 connected to input sides of the AND-gates 134. The plural reset detectors 120 are connected to an input side of each of the same number of the plural OR-gates 131 as the plural reset detectors 120. An output side of each of the plural OR-gates 131 is connected through the corresponding inverter 133 to the corresponding AND-gate 134. The first OR-gate 131 is connected directly to the second, third and fourth reset detectors 120 and also connected through the inverter 132 to the first reset detector 120. The second OR-gate 131 is connected directly to the first, third and fourth reset detectors 120 and also connected through the inverter 132 to the second reset detector 120. The third OR-gate 131 is connected directly to the first, second and fourth reset detectors 120 and also connected through the inverter 132 to the third reset detector 120. The fourth OR-gate 131 is connected directly to the first, second and third reset detectors 120 and also connected through the inverter 132 to the fourth reset detector 120. The first reset signal sent from the first reset detector 120 is transmitted to the first, second, third and fourth OR-gates 131 but only the first OR-gate 131 outputs the first reset signal. The second reset signal sent from the second reset detector 120 is transmitted to the first, second, third and fourth OR-gates 131 but only the second OR-gate 131 outputs the second reset signal. The third reset signal sent from the third reset detector 120 is transmitted to the first, second, third and fourth OR-gates 131 but only the third OR-gate 131 outputs the third reset signal. The fourth reset signal sent from the fourth reset detector 120 is transmitted to the first, second, third and fourth OR-gates 131 but only the fourth OR-gate 131 outputs the fourth reset signal.

The write data latch 112 has the same number of set/reset circuits 135 as the OR-gates 131. An output terminal of the first OR-gate 131 is connected directly to a set terminal of the first set/reset circuit 135 and also connected through the first inverter 133 and the first AND-gate 134 to a reset terminal of the first set/reset circuit 135. An output terminal of the second OR-gate 131 is connected directly to a set terminal of the second set/reset circuit 135 and also connected through the second inverter 133 and the second AND-gate 134 to a reset terminal of the second set/reset circuit 135. An output terminal of the third OR-gate 131 is connected directly to a set terminal of the third set/reset circuit 135 and also connected through the third inverter 133 and the third AND-gate 134 to a reset terminal of the third set/reset circuit 135. An output terminal of the fourth OR-gate 131 is connected directly to a set terminal of the fourth set/reset circuit 135 and also connected through the fourth inverter 133 and the fourth AND-gate 134 to a reset terminal of the fourth set/reset circuit 135.

The other input terminal of each of the AND-gates 134 is connected to the output terminal of the OR-gate 121 having four input terminals which are connected to the first, second, third and fourth reset detectors 120. Namely, the other input terminals of the AND-gates 134 are connected through the single OR-gate 121 to the other input terminals of the AND-gates 134, for which if any one of the reset detectors 120 sends a reset signal, write data are sent to the write data latch 112, wherein only corresponding one bit to the reset detector 120 having sent the reset signal is in ON-state whilst other bits corresponding to the other reset detectors 120 having sent no reset signals are in OFF-state.

The address data latch 111 has a plurality of set/reset circuits 136. The output terminal of the single OR-gate 121 is also connected to each of the set/reset circuits 136 in the address data latch 111, so that the reset detectors 120 are connected through the single OR-gate 121 to the set/reset circuits 136 in the address data latch 111, whereby if any one of the reset detectors 120 sends a reset signal, then address data are set to the address data latch 111.

An OR-gate 119 is provided which has a first input terminal connected to the internal bus 103 for receiving a write enable signal and also has a second input terminal connected to the output terminal of the single OR-gate 121, so that the reset detectors 120 are connected through the OR-gate 121 to the OR-gate 119. An output terminal of the OR-gate 119 is connected to a write time counter 117 in a write control circuit 114. If any one of the reset detectors 120 sends a reset signal, then the write time counter 117 counts a write time of the memory cell array 110.

Any one of the reset detectors 120 sends a reset signal, then corresponding one of the plural predetermined data is written into a designated address of the memory cell array 110 by the reset write circuit 130.

The microcomputer 101 accommodates various programs which have various functions, so that the microcomputer 101 controls operations of the address data latch 111 and the data read out circuit 113 to read out the data from the designated address of the memory cell array 110, wherein the data had been written by the reset write circuit 130.

Data processings by the data processor 100 of this embodiment will be described with reference to FIGS. 2 and 3. FIG. 2 shows parallel operations of the plural parts in the data processor 100 but does not show time-sequential processings of one part of the data processor 100.

The data processor 100 is connected to a host machine not illustrated in use for data processings in a step S2. The oscillator 105 generates a clock signal, so that the CPU executes the data processings in accordance with the clock signal, whereby data are stored into the EEPROM 102.

The ring oscillator 115 generates a clock signal, so that the write time counter 117 counts the write time, whereby data are written into the memory cell array 110 by a driving voltage with address data for having temporary writing the write data until the write time.

During the data processing by the data processor 100 in the step S2, the reset detectors 120 always monitor individual factors of requirements for reset operators in a step S1, so that the reset detector 120 having detected the reset factor sends a reset signal in a step S3.

The reset signal is transmitted through the OR-gate 121 to the microcomputer 101, whereby the CPU 104 and the oscillator 105 execute the system reset in a step S4.

The reset signal is also transmitted through the OR-gate 121 to the write control circuit 114 of the EEPROM 102, whereby the write counter 117 is initiated to count the write time in a step S5, and continues to count the write time until a count-up in a step S6.

In parallel to the above processes, the reset write circuit 130 generates corresponding one of the plural write data to the reset signal from the one of the reset detectors 120, so that the write data are set in the write data latch 112 in a step S7. The write data are transmitted from the write data latch 112 during the counting operation and written into the memory cell array 110 in a step S8.

As shown in FIG. 3, the data processor 100 executes the data processings in the steps S2 and 12, whilst there is verified read out operation of the write data of the reset factor in accordance with the input of a predetermined command from the host machine in a step T1.

Once the read out operation was verified, data are read out in the predetermined address of the memory cell array 110 in accordance with the appearance of the reset factor in the step T3. The data read out are transmitted to the host machine in a step T4 and then erased in a step T5.

In accordance with the data processor 100 of this embodiment, once one of the reset detectors 120 generates a reset signal upon appearance of the reset factor, the microcomputer 101 executes the system reset operation, wherein the write data corresponding to the reset factor are written by the reset write circuit 130 into the predetermined address of the memory cell array 110, so that the write data may be read out by the host machine.

It is possible to confirm or verify the reset factor having appeared in the data processor 100 which are in use of the user by the host computer which is in use of the maker side. It is possible to solve the trouble of the data processor 100 and also prevent any further generation of the same reset factor as well as detect user's incorrect operations.

There are provided the plural reset detectors 120 in correspondence to the plural reset factors. The reset write circuit 130 generates corresponding one of the predetermined plural kind data to the reset signal sent from one of the reset detectors 120, whereby it is possible to verify the reset factor.

The data about the reset factor are written by the reset write circuit 130 without use of the microcomputer 101. This allows that the reset factor data may be written into the memory cell array 110 whilst the microcomputer 101 executes the system reset operation.

The data about the reset factor are written into the specific address of the memory cell array 110, wherein no usual data are written into the specific address, so as to allow the data processor 100 to easily and surely read out the reset factor data.

The specific address are allocated for the EEPROM 102 for storing the reset factor data, for which reason no further data storage medium is needed for storing the reset factor data. The structure of the data processor is relatively simple and scaled down.

The memory cell array 110 comprises the EEPROM 102 for storing the usual data and the reset factor data in the above embodiment. As a modification, it is possible that the private storage medium is provided for storing the reset factor data separately from the main storage medium for storing the usual data.

SECOND EMBODIMENT

Figure 4:
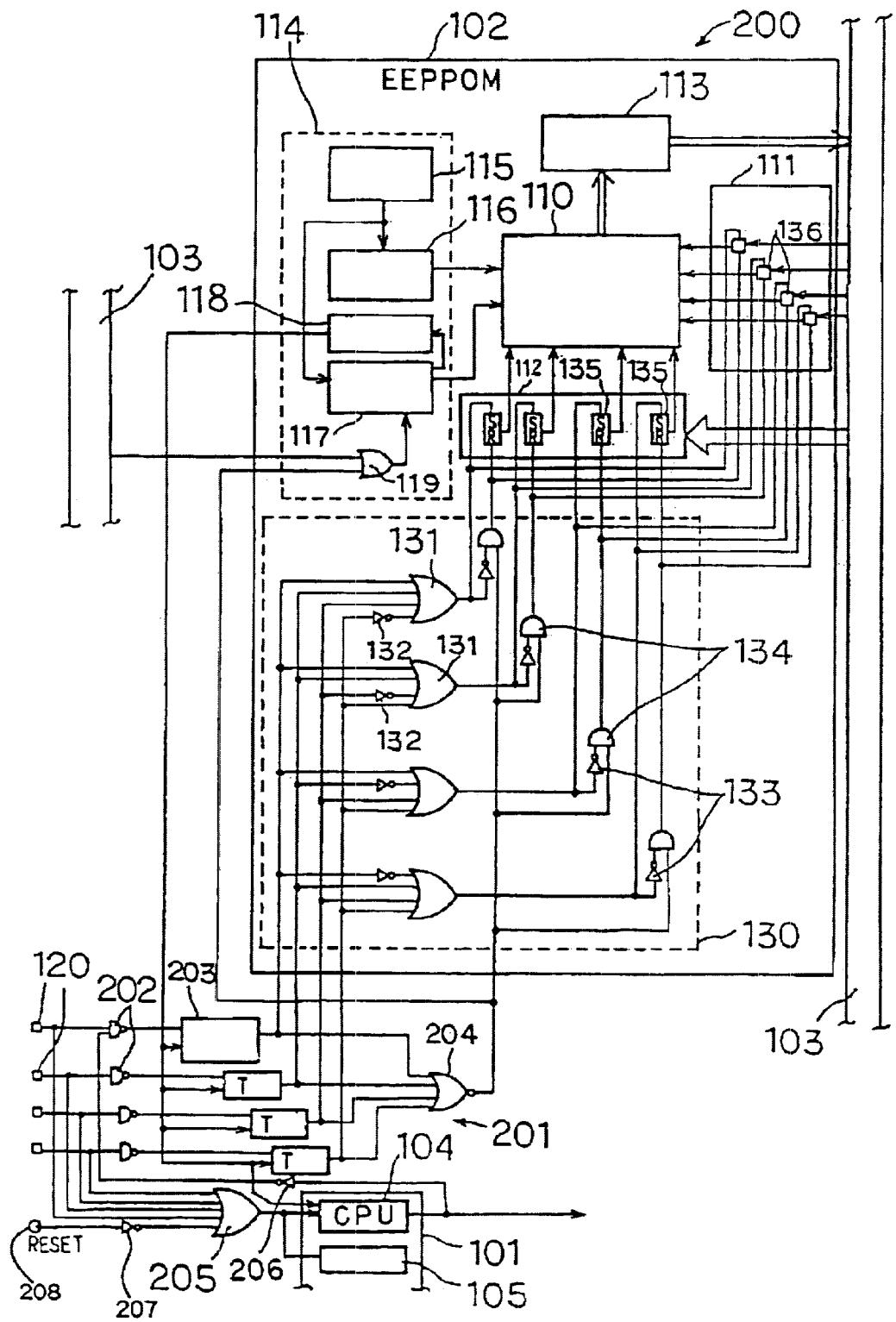
FIG. 4 is a block diagram illustrative of a second novel data processor of a second embodiment in accordance with the present invention.

A second embodiment in accordance with the present invention will be described. The descriptions will be focus only on differences of the second embodiment from the first embodiment to eliminate duplicate descriptions. FIG. 4 is a block diagram illustrative of a second novel data processor of a second embodiment in accordance with the present invention.

In this second novel data processor 200, a set of four output lines from the reset write circuit 130 is also connected to a set of four set/reset circuits 136 of the address data latch 111, so that the reset write circuit 130 generates predetermined addresses wherein one bit only is ON-state whilst other bits are OFF-state in correspondence with the reset signal from one of the plural reset detectors 120, whereby a data writing operation into the memory cell array 110 is made with this one of the plural predetermined addresses.

In the data processor 200, the reset detectors 120 are connected to a reset reservation circuit 201 for reserving the reset operation. The reset reservation circuit 201 is also connected to the EEPROM 102 and the microcomputer 101.

In the reset reservation circuit 201, each of the reset detectors 120 is connected to a NAND-gate 202 which is connected to a reset control circuit 203. Namely the same number of the NAND-gates 202 and the same number of the reset control circuits 203 as the reset detectors 120 are provided. The reset control circuits 203 are connected to a single NOR-gate 204.

The single NOR-gate 204 of the reset reservation circuit 201 is connected to the AND-gates 134 of the reset write circuit 130 in the EEPROM 102. The single NOR-gate 204 of the reset reservation circuit 201 is also connected to the OR-gate 119 in the write control circuit 114 in the EEPROM 102.

Other input terminal of each of the plural reset control circuits 203 is connected to the write flag latch 118 in the write control circuit 114 in the EEPROM 102. An output terminal of each of the plural reset control circuits 203 is connected through the inverter 132 to the OR-gate 131 in the reset write circuit 130.

The reset detectors 120 are connected through a single OR-gate 205 to the CPU 104 and the oscillator 105 in the microcomputer 101. A system reset output terminal of the CPU 104 is connected through an inverter 206 to other input terminals of the plural NAND-gates 202.

Upon receipt of the reset signal from the reset detector 120, the reset control circuit 203 transmits the reset signal to the reset write circuit 130 in the EEPROM 102, provided that the reset signal is inputted during when the write flag of the write flag latch 118 is in ON, then the transmission of the reset signal is reserved until the write flag becomes ON.

The OR-gate 205 is also connected through an inverter 207 to a reset input terminal 208 into which a reset signal is externally inputted for compulsorily executing the system reset to the microcomputer 101.

The operations of the above second novel data processor 200 will be described. Upon appearance of the reset factor, corresponding one of the reset detectors 120 to the reset factor sends a reset signal, so that the reset write circuit 130 generates corresponding address data to set the same to the address data latch 111, whereby reset factor data are written into the predetermined address corresponding to the reset factor in the memory cell array 110.

If the reset factor is generated during write operation for writing he usual data, the microcomputer 101 executes the system reset operation.

The write flag latch 118 in the EEPROM 102 sends the reset control circuit 203 a notice of current write operation, then the reset control circuit 203 waits for transmission of the reset signal and preserves the reset operation to the EEPROM 102 until the current data write operation has been completed.

The write data latched in the write data latch 112 are written by the EEPROM 102 into the address of the address data latched in the address data latch 111.

The write flag latch 118 sends the reset control circuit 203 a notice of completion of the data write operation. The reset control circuit 203 transmits the reset signal to the reset write circuit 130 in the EEPROM 102, so that data representing the reset factor generation are written at the private or specific address of the memory cell array 110.

One of the plural kind reset factors is generated, data are written into the corresponding one of the plural private addresses of the EEPROM 102 so that it is possible to verify the reset factor in accordance with the address into which the reset data are stored. The individual reset factor data are written into the corresponding plural specific addresses, so that it is possible to verify all of the reset factors having sequentially appeared.

If the reset factor is generated during the write operation of the usual data, then the microcomputer executes the system reset operation, whilst the reset operation of the EEPROM 102 is preserved until the current data write operation is completed, so that the write data about the reset factor are not lost. After the current data write operation is completed, then the data about the reset factor are written.

In the above second embodiment, in order to prevent the current data loss, the reset control circuit 203 preserves the reset operation of the EEPROM 102 which is in use of the usual data write operation. It is also possible as a modification that the data latch 112 is provided on two stages for usual write data and for reset factor write data.

The reset factor data are written into the corresponding specific address to the individual reset factors and also the content of the reset factor data corresponds to the individual reset factor, for which reason it is possible to verify the reset factor. It is also possible to simplify the circuit configuration so that the content of the reset factor data is common to the individual reset factor because the reset factor can be verified on the basis of the address at which the reset factor data are stored.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A data processor comprising:
   a memory for writing and reading data;
   a data processing unit being connected to said memory for controlling read out operation of data from said memory and also for executing a reset operation upon an external input of a reset signal;
   a reset detector unit being connected to said data processing unit for sending said reset signal corresponding to a generated reset factor to said data processing unit; and
   a non-volatile reset memory being connected to said reset detector unit for storing a history of sending said reset signal from said reset detector unit,
   wherein said reset detector unit comprises a plurality of reset detector each sending a reset signal, and said data processor further comprising a logic gate directly between said plural reset detectors and said data processing unit for transmitting one of said reset signals to the data processing unit.

2. The data processor as claimed in claim 1, wherein the reset factor is written into the non-volatile reset memory during the reset operation.

3. A data processor comprising:
   a non-volatile memory for writing and reading usual data to and from usual addresses and also for writing and reading reset factor data about reset factor to and from specific addresses;
   a data processing unit being connected to said non-volatile memory for controlling read out operation of data from said non-volatile memory and also for executing a reset operation upon an external input of a reset signal;
   a plurality of reset detectors being connected to said data processing unit for sending individual reset signals corresponding to individual reset factors to said data processing unit;
   a reset write unit being connected to said reset detector unit for writing corresponding one of plural kind reset factor data to said reset signal from said reset detector into corresponding address of said non-volatile memory; and
   a write judging unit for verifying a current write data operation into said non-volatile memory, said data processing unit controlling said current data write operation, so that if said write judging unit verifies said current data write operation, then said data processing unit executes a reset operation and said reset write unit delays a reset data write operation.

4. The data processor as claimed in claim 3, wherein said reset write unit generates data with plural bits which correspond to the factors for sending individual reset signals from the plural reset detectors.

5. The data processor as claimed in claim 3, further comprising a data read out unit for reading out said reset factor data from a predetermined address of said non-volatile memory.

6. The data processor according to claim 3, further comprising a write data latch connected between said reset write unit and said non-volatile memory.

7. The data processor according to claim 6, wherein the data latch comprises a plurality of set/reset circuits, and wherein the data processor has a same number of said plural set/reset circuits as said plural reset detectors.

8. The data processor according to claim 6, further comprising a plurality of logic gates connected between said plural reset detectors and said write data latch, wherein the data processor has a same number of said plural logic gates as said plural reset detectors.

9. A data processor comprising:

a non-volatile memory for writing and reading usual data to and from usual addresses and also for writing and reading reset factor data about reset factor to and from specific addresses;

a data processing unit being connected to said non-volatile memory for controlling read out operation of data from said non-volatile memory and also for executing a reset operation upon an external input of a reset signal;

a plurality of reset detectors being connected to said data processing unit for sending individual reset signals corresponding to individual reset factors to said data processing unit;

a reset write unit being connected to said reset detector unit for writing reset factor data into corresponding address of said non-volatile memory to said reset signal from said reset detector; and a write judging unit for verifying a current data write operation to said non-volatile memory, said data processing unit controlling said current data write operation, so that if said write judging unit verifies said current data write operation, then said data processing unit executes a reset operation and said reset write unit delays a reset data write operation.

10. The data processor as claimed in claim 9, wherein said reset write unit generates data with plural bits which correspond to the facts of sending individual reset signals from the plural reset detectors.

11. The data processor as claimed in claim 9, further comprising a data read out unit for reading out said reset factor data from a predetermined address of said non-volatile memory.

12. A data processor comprising:

a non-volatile memory for writing and reading usual data to and from usual addresses and also for writing and reading reset factor data about reset factor to and from specific addresses;

a data processing unit being connected to said non-volatile memory for controlling read out operation of data from said non-volatile memory and also for executing a reset operation upon an external input of a reset signal;

a plurality of reset detectors being connected to said data processing unit for sending individual reset signals corresponding to individual reset factors to said data processing unit;

a reset write unit being connected to said reset detector unit for writing corresponding one of plural kind reset factor data to said reset signal from said reset detector into corresponding address of said non-volatile memory; and a write data latch connected between said reset write unit and said non-volatile memory, wherein the data latch comprises a plurality of set/reset circuits, and wherein the data processor has a same number of said plural set/reset circuits as said plural reset detectors.

* * * * *